Dec. 5, 1933.   W. E. McDONNELL ET AL   1,937,902
EYEGLASS OR SPECTACLE MOUNTING
Filed Jan. 5, 1931
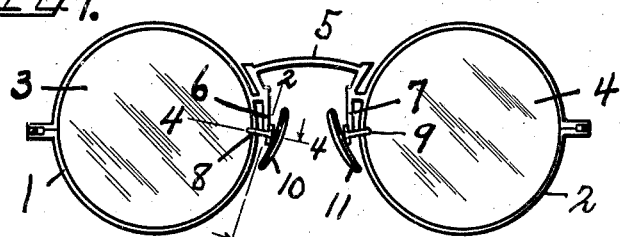
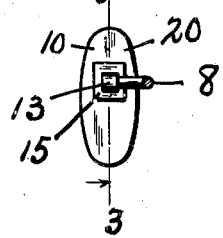
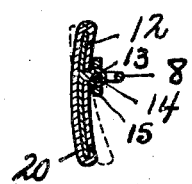
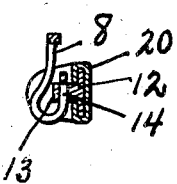
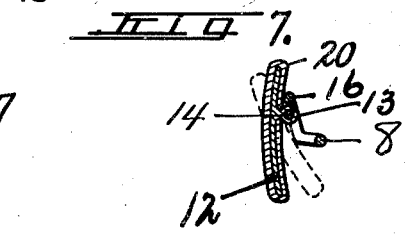
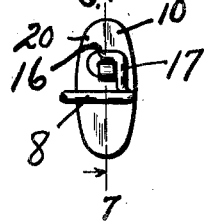
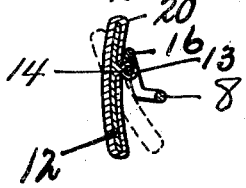
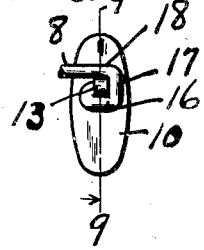
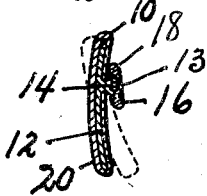

Patented Dec. 5, 1933

1,937,902

UNITED STATES PATENT OFFICE 1,937,902

EYEGLASS OR SPECTACLE MOUNTING

William E. McDonnell and Roman J. Groh, Jr., Rochester, N. Y., assignors to Shuron Optical Company, Inc., Geneva, N. Y., a corporation of New York Application January 5, 1931. Serial No. 506,611

4 Claims. (Cl. 88—49)

This invention relates to certain new and useful improvements in eye glass or spectacle mountings, and pertains specifically to a mounting for a rocking nose pad.

Although it is desirable to so construct a mounting that the nose pads may have limited rocking movement in a lengthwise direction, any accompanying lateral rocking movement is undesirable, and considerable difficulty has been experienced due to the failure of present constructions to provide for lengthwise rocking movement that can be readily adjusted and limited to the desired extend while avoiding lateral rocking movement of the pads.

Further, in present constructions, when a pad is damaged or destroyed, it is difficult and in many cases practically impossible to remove the pad without damaging its mounting or securing means to such an extent that it is at least difficult, if not impossible, to attach a new pad.

The main object of the present invention is to provide a construction of pad mounting, avoiding the difficulties inherent in the present known constructions.

Other objects and advantages relate to the details of the structure and the form and relation of the parts thereof, all as will more fully appear from the following description, taken in connection with the accompanying drawing in which:—

Figure 1 is a rear elevation of a mounting of this invention.

Figure 2 is a section on line 2—2, Figure 1.

Figure 3 is a section on line 3—3, Figure 2.

Figure 4 is a section on line 4—4, Figure 1.

Figure 5 is a perspective view of a portion of a preferred form of arm for supporting a pad.

Figure 6 is a view similar to Figure 2, of a modified construction.

Figure 7 is a section on line 7—7, Figure 6.

Figure 8 is a view similar to Figure 2, of a further modified construction.

Figure 9 is a section on line 9—9, Figure 8.

Figure 1 illustrates an eye glass or spectacle mounting comprising lens frames 1 and 2 carrying lenses 3 and 4, respectively, the frames being connected together by bridge 5. In the particular construction illustrated, the depending arms 6 and 7 of the bridge carry looped arms 8 and 9 which arms, in turn, carry the respective pads 10 and 11.

The particular feature of this invention resides in the structure for supporting pads 10 and 11 in a manner to permit longitudinal rocking of the pads within adjustable limits and providing for ready and easy assemblage of the pads with their supporting arms while permitting ready removal or separation of the pads from their supporting arms without damaging the supporting structure whereby new pads may be applied as desired.

The pads and their supporting means, as illustrated in the drawing, are of identical construction, and a description of one constitutes a description of both. The pad comprises an elongated plate 12 of metal or the like, which may be longitudinally curved as desired and is bendable for that purpose. The drawing discloses metallic plate 12 as provided with a covering 20 of zylonite or similar suitable material, but such covering has no relation to the present invention and may be used or omitted as desired. The rear face of the plate 12 is provided with a transverse journal bearing 13 which may be formed integrally with the plate, or may be secured thereto in any suitable manner.

The arm as 8 (the preferred form being shown in Figure 5) is formed at its free end with a tang 14 which is adapted to fit within the journal bearing 13 with a comparatively tight fit to assist in preventing lateral rocking movement of the pad while permitting longitudinal rocking movement. Additional means is provided in connection with the arm 8 for limiting in an adjustable manner, the lengthwise rocking movement of the pad about the tang 14.

The preferred form of this additional means is illustrated in Figure 5 as a boxlike structure or enclosure secured to the arm 8 at the base of the tang 14 and adapted to enclose the tang. The shape of this box is preferably substantially the same as the base of the journal bearing 13 so as to fit tightly over the journal bearing and enclose the same. The arm 8, as constructed for assemblage with a pad having a journal bearing 13, is such that the boxlike structure 15 is disposed at an angle to the lengthwise axis of the arm 8 and tang 14 so as to permit the tang 14 to be slid into its bearing 13 whereupon the enclosure or boxlike structure 15 is bent downwardly around the journal 13 so as to enclose it and prevent removal of the tang from the bearing. Further, the extent to which the enclosure 15 is bent toward the rear surface of the pad 8 will determine the extent of the rocking movement which the pad may have about the tang 14, thus providing a ready adjustment.

It will be apparent that the assemblage of this structure can be readily and easily effected and that it is only necessary to deflect the enclosure or boxlike structure 15 away from the rear surface of the pad to effect ready separation of the arm and pad and permit the substitution of a new or different pad, whereupon the enclosure 15 may again be bent or deflected toward the rear surface of pad 10 to secure the arm and pad together and to act as an adjustable limiting stop for predetermining the extent of rocking movement of the pad 10.

In Figures 6 and 7 a modified construction is shown in which, in a manner similar to the structure of Figure 5, the end of the arm 8 constitutes a tang 14 which is inserted in the journal bearing 13 whereupon the arm is returned bent as shown at 16 so as to extend along one side of journal bearing 13, and is again bent at 17 so as to extend along one end of journal bearing 13. In this construction the bent portions 16 and 17 constitute the means for securing the tang 14 in the bearing 13, and in like manner heretofore described in connection with the enclosure 15, these parts can be adjusted toward and from the rear surface of the pad to limit the extent of longitudinal rocking movement of the pad.

The structure shown in Figures 8 and 9 adds to that illustrated in Figures 6 and 7 a further bent portion 18 in the arm 8 which extends along the side of the bearing 13 opposite the portion 16 so that there is in effect provided a boxlike structure or enclosure extending around the journal bearing 13 and adjustable to effect the same purposes accomplished by the enclosure 15.

Although we have shown and described specific structures as constituting embodiments of our invention, we do not desire to restrict ourselves to the details of construction and arrangement as shown, for the reason that various changes and modifications may be made without departing from the spirit of the invention as set forth in the appended claims.

We claim:

1. In an eye-glass mounting, a nose pad having a journal bearing thereon, a supporting arm for said pad provided at its end with a substantially square frame with continuous walls, a tang secured to one wall of said frame and extending inwardly across the frame and of a length substantially equal to the interior width of the frame, said tang being positioned in said journal bearing and said frame extending around and inclosing said bearing.

2. In an eye-glass mounting, a nose pad having a tubular bearing projecting rearwardly therefrom with its axis substantially parallel with the rear face of the pad transversely thereof, a supporting arm for said pad provided at its end with a substantially square frame, a tang secured to one wall of said frame and extending inwardly across the frame and of a length substantially equal to the interior width of the frame, said tang being positioned in said bearing, and said frame extending around and enclosing said bearing.

3. In an eye-glass mounting, a nose pad having a tubular bearing projecting rearwardly therefrom with its axis substantially parallel with the rear face of the pad transversely thereof, a supporting arm for said pad having one end portion extending into said bearing and terminating adjacent the opposite end thereof, said arm having an intermediate portion bent around the two sides and the open end of said bearing so as to substantially enclose the bearing.

4. In an eye-glass mounting, a nose pad having a tubular bearing projecting rearwardly therefrom with its axis substantially parallel with the rear face of the pad transversely thereof, a supporting arm for said pad provided at its end with a frame having continuous unbroken walls, a tang secured to one edge of the frame and extending substantially centrally across the frame to a point adjacent the opposite edge of the frame, said tang being positioned in said bearing and said frame extending around and enclosing said bearing.

WILLIAM E. McDONNELL.
ROMAN J. GROH, Jr.